(12) United States Patent
Matsuda

(10) Patent No.: US 12,112,078 B2
(45) Date of Patent: Oct. 8, 2024

(54) INFORMATION PROCESSING APPARATUS CAPABLE OF EXTENDING PRINT FUNCTIONS AND STORAGE MEDIUM

(71) Applicant: CANON KABUSHIKI KAISHA, Tokyo (JP)

(72) Inventor: Shoichi Matsuda, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/357,525

(22) Filed: Jul. 24, 2023

(65) Prior Publication Data
US 2024/0036775 A1    Feb. 1, 2024

(30) Foreign Application Priority Data
Jul. 26, 2022  (JP) ................. 2022-118395

(51) Int. Cl.
*G06F 3/12*    (2006.01)

(52) U.S. Cl.
CPC ............ *G06F 3/1204* (2013.01); *G06F 3/121* (2013.01); *G06F 3/1225* (2013.01); *G06F 3/1254* (2013.01); *G06F 3/1284* (2013.01)

(58) Field of Classification Search
CPC ...... G06F 3/1204; G06F 3/121; G06F 3/1225; G06F 3/1254; G06F 3/1284
See application file for complete search history.

(56) References Cited

U.S. PATENT DOCUMENTS

| 2015/0356380 A1* | 12/2015 | Nakata | G06F 3/1205 |
| | | | 358/1.15 |
| 2020/0012459 A1* | 1/2020 | Yamazaki | G06F 3/1228 |
| 2020/0142650 A1* | 5/2020 | Saiki | G06F 3/1204 |
| 2021/0389913 A1* | 12/2021 | Kogure | G06F 3/1285 |

FOREIGN PATENT DOCUMENTS

JP    2021177356 A    11/2021

* cited by examiner

*Primary Examiner* — Nicholas Pachol
(74) *Attorney, Agent, or Firm* — Canon U.S.A., Inc. IP Division

(57) ABSTRACT

An information processing apparatus includes one or more memories storing a print data generation software, an extension application, and an operating system, and a processor in communication with the one or more memories, wherein the memory and the processor are configured to extend a function in association with the print data generation software, and cause a screen to display print function information about the print data generation software, acquire paper information from a printing apparatus, and add the acquired paper information to the print function information about the print data generation software so that existing paper information is arranged on top.

12 Claims, 15 Drawing Sheets

```
<?xml version="1.0" encoding="utf-8"?>
<PrintDeviceCapabilities
   xmlns:ns0001="http://www.canon.com/ns/printschema/inkjet/v100"...>
      ...
   <psk:PageMediaType psf2:psftype="Feature">
      <psk:AutoSelect psf2:psftype="Option" psf2:default="true"/>      ~302
      <psk:Plain psf2:psftype="Option" psf2:default="false"/>
      <psk:Photographic psf2:psftype="Option" psf2:default="false"/>
      <psk:EnvelopePlain psf2:psftype="Option" psf2:default="false"/>
   </psk:PageMediaType>
      ...
</PrintDeviceCapabilities>
```

FIG.5A

| PARAMETER (SETTING ITEM NAME) | VALUE (SETTING VALUE NAME) |
|---|---|
| dmMediaType (MEDIUM) | 259 (AUTO SELECT) |
| dmPaperSize (PAPER SIZE) | 9 (A4) |
| dmDefaultSource (PAPER FEED METHOD) | 15 (AUTO SELECT) |
| ... | |

FIG.5B

| dmMediaType VALUE | SETTING VALUE NAME |
|---|---|
| 259 | AUTO SELECT |
| 1 | PLAIN PAPER |
| 258 | PHOTOGRAPHIC |
| 257 | ENVELOPE |

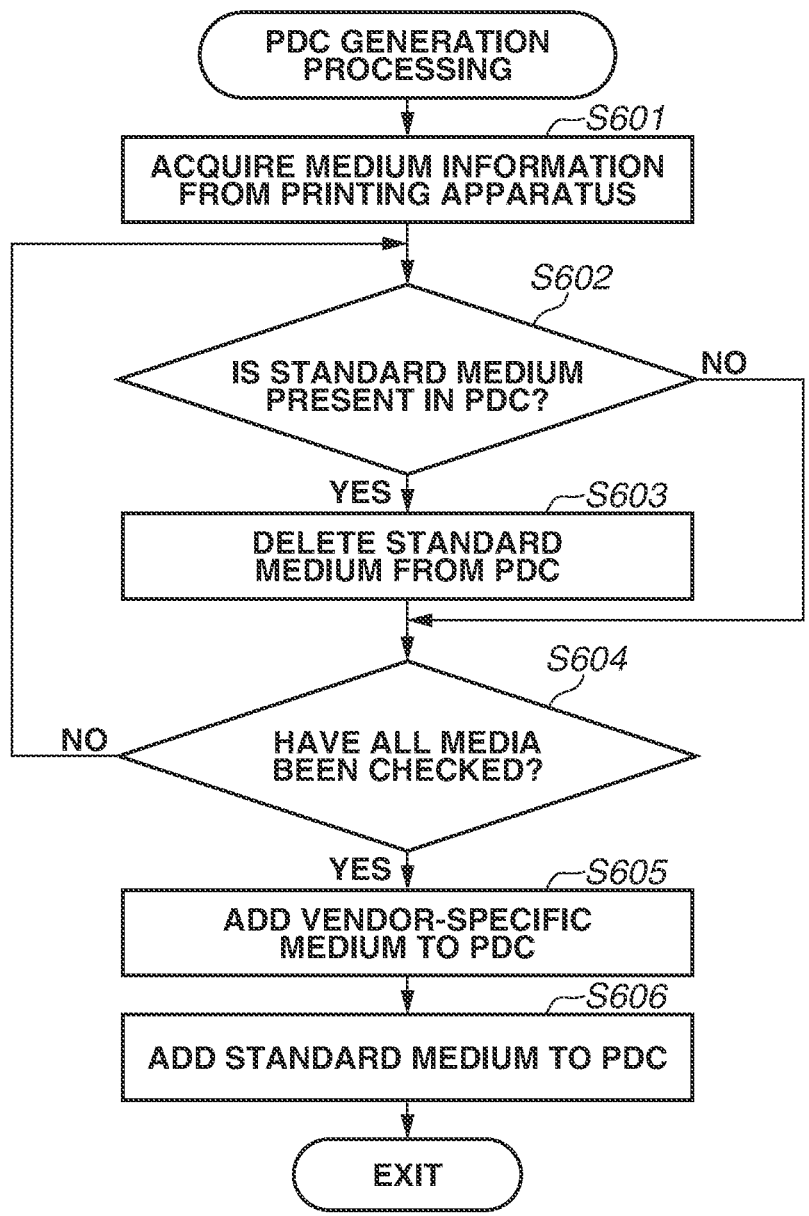

FIG.7

```xml
<?xml version="1.0" encoding="utf-8"?>
<PrintDeviceCapabilities
xmlns:ns0001="http://www.canon.com/ns/printschema/inkjet/v100" ...>
...
<psk:PageMediaType psf2:psftype="Feature">
  <ns0002:canon.mtplatinum psf2:psftype="Option" psf2:default="false"/>
  <ns0002:canon.mtcrystal psf2:psftype="Option" psf2:default="false"/>
  ...
  <ns0002:canon.mthagaki psf2:psftype="Option" psf2:default="false"/>
  <ns0002:canon.mthagakia psf2:psftype="Option" psf2:default="false"/>
  <ns0002:canon.mtdisca psf2:psftype="Option" psf2:default="false"/>
  <ns0002:canon.mtdiscb psf2:psftype="Option" psf2:default="false"/>
  <psk:AutoSelect psf2:psftype="Option" psf2:default="true"/>
  <psk:Plain psf2:psftype="Option" psf2:default="false"/>
  <psk:Photographic psf2:psftype="Option" psf2:default="false"/>
  <psk:EnvelopePlain psf2:psftype="Option" psf2:default="false"/>
</psk:PageMediaType>
...
</PrintDeviceCapabilities>
```

| dmMediaType VALUE | SETTING VALUE NAME |
|---|---|
| 269 | VENDOR-SPECIFIC MEDIUM A |
| ... | |
| 262 | VENDOR-SPECIFIC MEDIUM H |
| 261 | VENDOR-SPECIFIC MEDIUM I |
| 260 | VENDOR-SPECIFIC MEDIUM J |
| 259 (INITIAL VALUE) | AUTO SELECT |
| 1 | PLAIN PAPER |
| 258 | PHOTOGRAPHIC |
| 257 | ENVELOPE |

FIG.14

| dmMediaType VALUE | SETTING VALUE NAME |
|---|---|
| 269 | VENDOR-SPECIFIC MEDIUM B |
| ... | |
| 262 | VENDOR-SPECIFIC MEDIUM I |
| 261 | VENDOR-SPECIFIC MEDIUM J |
| 260 | AUTO SELECT |
| 259 (INITIAL VALUE) | VENDOR-SPECIFIC MEDIUM A (GLOSSY PRO PLATINUM) |
| 1 | PLAIN PAPER |
| 258 | PHOTOGRAPHIC |
| 257 | ENVELOPE |

INFORMATION PROCESSING APPARATUS CAPABLE OF EXTENDING PRINT FUNCTIONS AND STORAGE MEDIUM

BACKGROUND

Field

The present disclosure relates to a technique for extending a printing function.

Description of the Related Art

A configuration is known in which a printer driver installed in a host computer as software for controlling a printing apparatus is used to issue a print instruction to a printing apparatus connected to the host computer. An operating system (OS), which is a basic software, is installed in the host computer, and the printer driver is configured in accordance with specifications defined by the OS and is called from the OS to operate. A vendor who provides a printing apparatus can provide a means for instructing the printing apparatus to perform printing using an OS by providing a printer driver compatible with the specifications of the OS.

In recent years, a standard class driver (hereinafter, also referred to as a "standard driver") which can be commonly used in printing apparatuses provided by a plurality of vendors has been provided in Windows®. Such a standard driver is included in an OS package, and can be easily used by connecting a printing apparatus to the host computer. Thus, it is not necessary to separately install a model-specific printer driver suitable for the printing apparatus, which is highly convenient. The standard driver is configured to be able to accept designation of a print function in accordance with PrintCapabilities generated based on information acquired from the connected printing apparatus. As a result, the user who uses the standard driver can designate the print function corresponding to the capability of the connected printing apparatus even though the user uses one standard driver.

An application for extending functions (hereinafter, also referred to as an "extension application") can be associated with the standard driver. The extension application can be provided by a vendor who provides the printing apparatus. The vendor can provide a function (extended function) which cannot be implemented only by the standard driver by providing the extension application. Japanese Patent Application Laid-Open No. 2021-177356 discloses a technique related to a setting at the time of initial activation of an extension application.

When the extension application is associated with the standard driver, the extension application can add and display information about a paper type (hereinafter, also referred to as a "medium") unique to the vendor acquired from the printing apparatus. Before the extension application is associated with the standard driver, the standard driver defines a setting value (numerical value) corresponding to each supported medium, and saves a setting value (numerical value) corresponding to a medium set as a print setting initial value of the standard driver. However, when the extension application is associated therewith, setting values (numerical values) of media including a vendor-specific medium added by the extension application are redefined. Thus, the setting value (numerical value) corresponding to the medium set as the print setting initial value is the same before and after the association of the extension application. Since the medium indicated by the value is changed, the set medium can change when the extension application is associated therewith.

In Japanese Patent Application Laid-Open No. 2021-177356, an initial value at the time of activation of the extension application can be determined based on a setting file. The setting file may need to be prepared in advance, which could result in additional work for the user.

SUMMARY

According to an aspect of the present disclosure, an information processing apparatus includes one or more memories storing a print data generation software, an extension application, and an operating system, and a processor in communication with the one or more memories, wherein the memory and the processor are configured to extend a function in association with the print data generation software, and cause a screen to display print function information about the print data generation software, acquire paper information from a printing apparatus, and add the acquired paper information to the print function information about the print data generation software so that existing paper information is arranged on top.

Further features of the present disclosure will become apparent from the following description of exemplary embodiments with reference to the attached drawings.

BRIEF DESCRIPTION OF THE DRAWINGS

FIG. 3 illustrates an example of Print Device Capabilities (PDC).

FIGS. 5A and 5B illustrate examples of print setting values.

FIG. 6 is a flowchart of an editing process of print function information.

FIG. 7 illustrates an example of PDC after editing.

FIG. 8 illustrates an example of setting values of media after editing of the PDC.

FIG. 14 illustrates an example of setting values of media after editing of the PDC according to the second exemplary embodiment.

DESCRIPTION OF THE EMBODIMENTS

Figure 1:
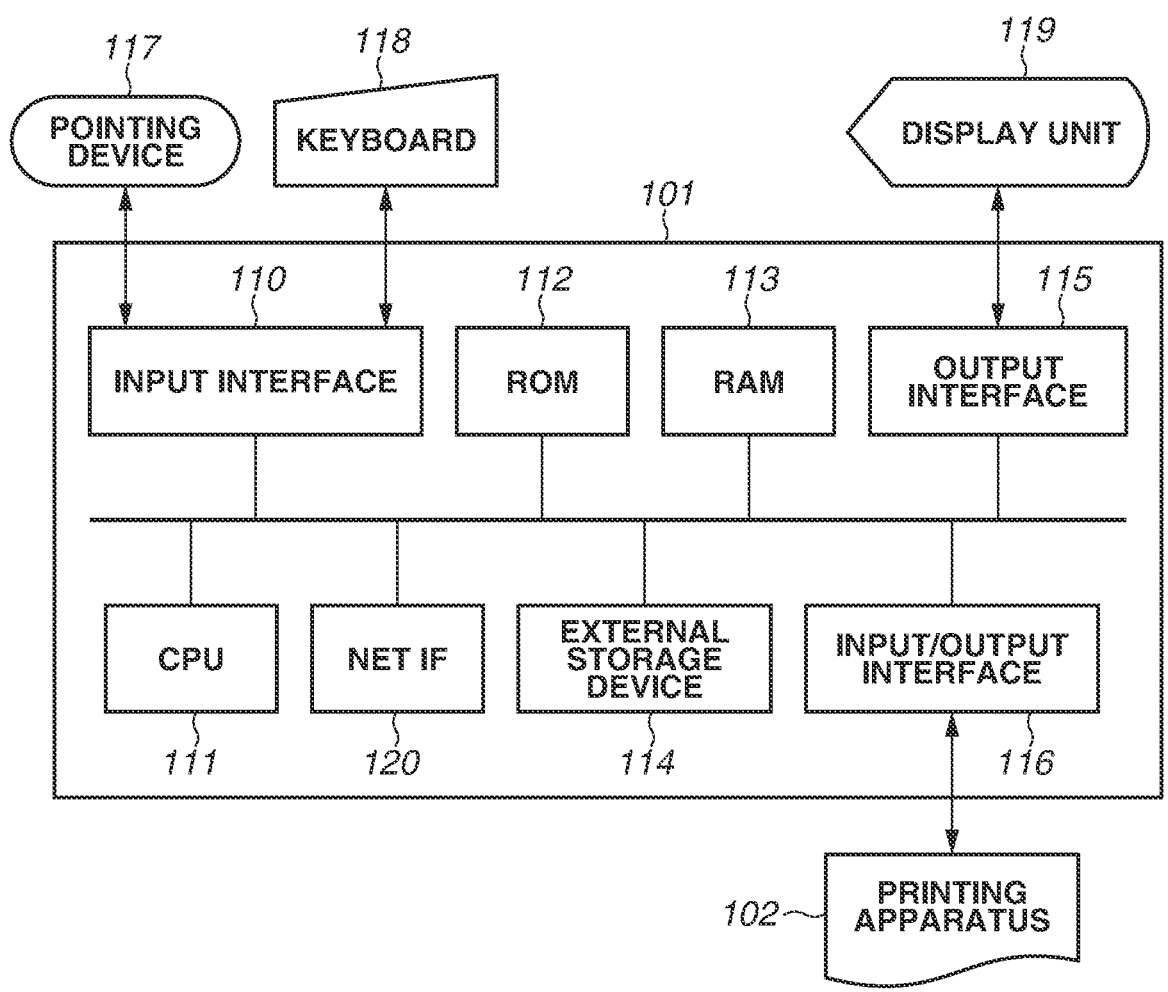
FIG. 1 is a block diagram illustrating a hardware configuration of a printing system.

Hereinafter, exemplary embodiments of the present disclosure will be described in detail with reference to the accompanying drawings. The following exemplary embodiments are not intended to limit the present disclosure set forth in the appended claims, and not all combinations of features described in the exemplary embodiments are necessarily indispensable to solving means of the present disclosure. The same reference numerals denote similar constituent elements, and a description thereof will be omitted.

<Hardware Configuration of Printing System>

FIG. 1 is a block diagram illustrating a hardware configuration of a printing system. In FIG. 1, a host computer 101 is an example of an information processing apparatus, and includes an input interface 110, a central processing unit (CPU) 111, a read-only memory (ROM) 112, a random access memory (RAM) 113, an external storage device 114, an output interface 115, and an input/output interface 116. Input devices, such as a keyboard 118 and a pointing device 117, are connected to the input interface 110, and a display device, such as a display unit 119, is connected to the output interface 115. A network (NET) interface (IF) 120 is a network interface and performs control for performing data transfer with an external device via a network.

An initialization program is stored in the ROM 112. The external storage device 114 stores a group of application programs, an operating system (OS), print data generation software, and other various kinds of data. The RAM 113 is used as a work memory (holding unit) when various programs stored in the external storage device 114 are executed, so that the various programs can be operated in the host computer 101.

In the present exemplary embodiment, the CPU 111 performs processing according to the procedure of a program stored in the ROM 112, thereby executing a function (to be described below) of the host computer 101 and processing relating to a flowchart (to be described below). A printing apparatus 102 that is a device is connected to the host computer 101 via the input/output interface 116. While the host computer 101 and the printing apparatus 102 are separately configured, they may be configured as a single information processing apparatus. An inkjet printer that performs printing by discharging ink onto a paper surface will be described as an example of the printing apparatus, but printing may be executed by another method (for example, an electrophotographic method). The host computer 101 may be a desktop personal computer, a smartphone, or a notebook personal computer.

<Configuration of Printing System Centering on Software>

Figure 2A:
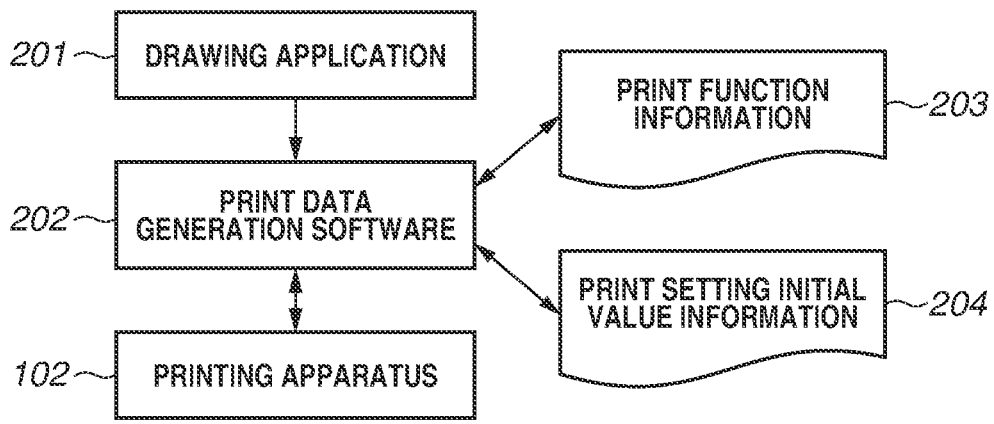
FIGS. 2A and 2B are configuration diagrams of the printing system.
Figure 2B:
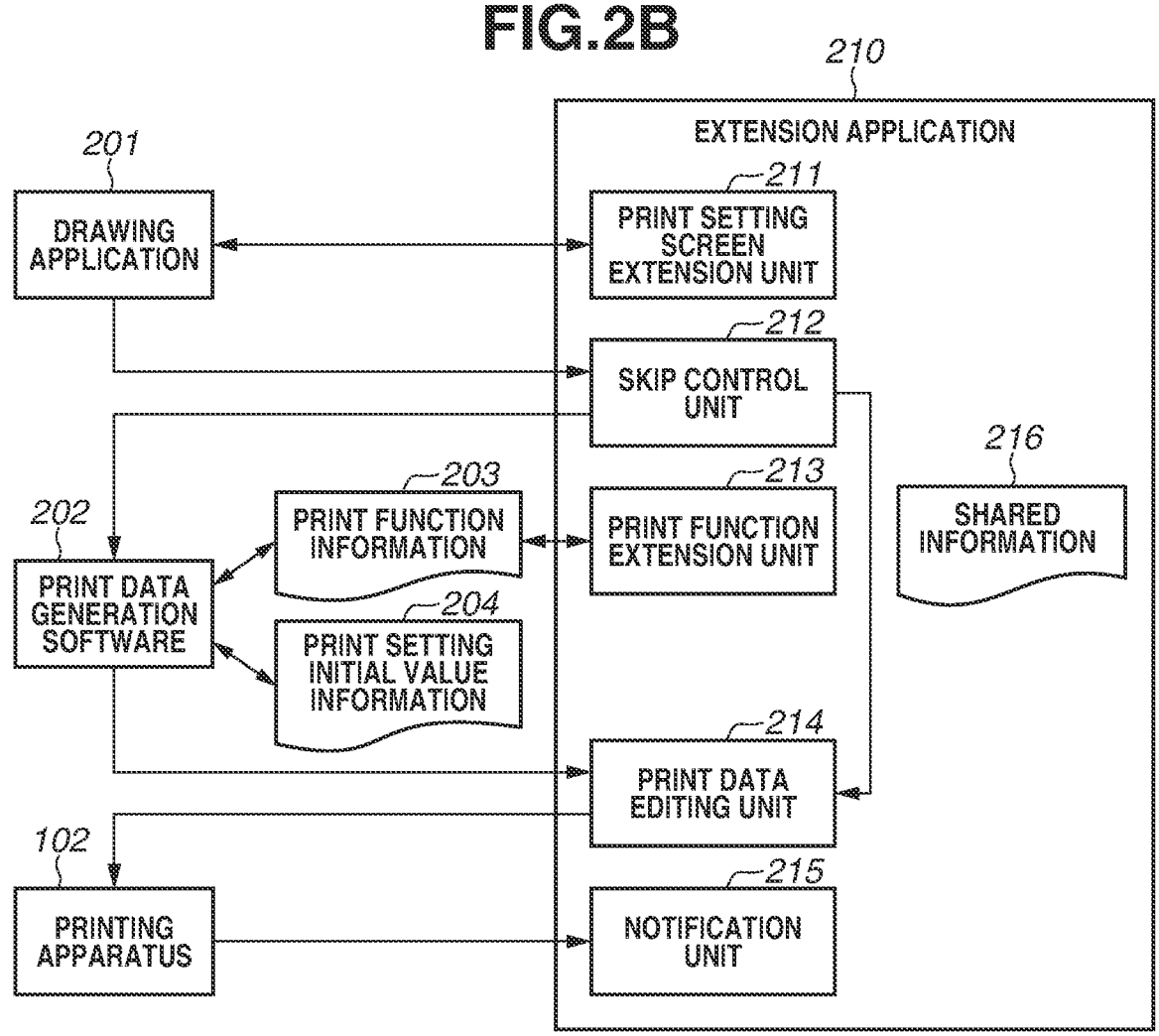

FIGS. 2A and 2B are diagrams schematically illustrating a configuration of a printing system. The following description assumes a printing system using the host computer 101 into which Windows® 11 of Microsoft® is installed as an OS. FIG. 2A illustrates a general configuration in a case where an extension application 210 is not associated with a print data generation software 202 or the printing apparatus 102.

A drawing application 201 is software for creating contents (drawing data) to be printed. Examples of the drawing application 201 include a document creation application and a spreadsheet application. Upon receiving a print request from a user, the drawing application 201 issues a print instruction to the OS. The print instruction includes print setting information for instructing operations of the print data generation software 202 and the printing apparatus 102. The print setting information is also referred to as a PrintTicket (hereinafter, "PT").

In order to output the print setting information, the drawing application 201 can display a print setting screen provided by any one of the print data generation software 202, the OS, and the drawing application 201. The print setting screen includes setting items (hereinafter, also referred to as "control items") indicating print functions that can be set based on capability information (information that can be set as print settings) acquired from the print data generation software 202, and control items indicating setting values thereof.

The capability information is also called PrintCapabilities (hereinafter, "PC").

The print data generation software 202 determines the PC based on print function information 203.

The print function information 203 is data indicating print functions, and the data describes all settable print functions, their setting values, and an exclusion relation between the setting values. The print function information 203 is also called Print Device Capabilities (PDC). The print function information 203 is included in a configuration file of the print data generation software 202, and is arranged in the external storage device 114 as an unchangeable file. Alternatively, the print function information 203 can be dynamically generated by the print data generation software 202. More specifically, the print data generation software 202 or the OS can be configured to acquire attribute data on the printing apparatus from the printing apparatus 102 (acquisition processing) and generate the print function information 203 based on attribute information in the acquired attribute data. When the print function information 203 is dynamically generated, the generated print function information 203 can be edited. The attribute data on the printing apparatus acquired from the printing apparatus 102 is a response acquired as a result of issuing a Get-Printer-Attributes operation of the Internet Printing Protocol (IPP) to the printing apparatus. The response includes attribute information indicating functions that can be designated by the printing apparatus 102 (capabilities of the printing apparatus), and setting values associated with the attribute information. The response is stored in the RAM 113.

With this configuration, the print data generation software 202 can be configured to allow the user to designate a print function available in each printing apparatus 102 depending on the connected printing apparatus 102. More specifically, even when a printing apparatus having a different function or a printing apparatus developed by a different vendor is connected, the print data generation software 202 can be configured to allow the user to designate a usable print function depending on the connected printing apparatus. A configuration in which an IPP class driver installed in Windows® 11 is used as the print data generation software 202 will be described. The IPP class driver is a printer driver that executes print processing in accordance with the specifications of a standard printing protocol called IPP, and is included in the package of the OS. The IPP class driver is not a printer driver unique to a model of the printing apparatus 102, but is a standard class driver that can be used in common by a plurality of printing apparatuses. The IPP class driver acquires capability information about the connected printing apparatus 102 so that the user can designate a print function supported by the connected printing apparatus 102, and generates the print function information 203 based on the acquired information. Print setting initial value information 204 is a setting value used when the print setting screen is activated.

FIG. 2B is a diagram illustrating a configuration in a case where the extension application 210 is associated with the print data generation software 202 and the printing apparatus 102. In the following description, configurations and processes that are not particularly mentioned are the same as those in FIG. 2A.

The extension application 210 is software for expanding functions of the print data generation software 202, and is software that is not included in the OS in advance (not packaged together). Thus, it is necessary for the user to operate the host computer 101 to download the extension application 210 from a server via the Internet and install the extension application 210. Alternatively, the extension application 210 may be automatically installed based on the connection of the printing apparatus 102 to the host computer 101. More specifically, when the printing apparatus 102 is connected to the host computer 101, the OS acquires device identification information from the printing apparatus 102.

The OS may download the extension application 210 corresponding to the acquired device identification information from a server via the Internet and install the extension application 210. In other words, the print data generation software 202 and the extension application 210 are held in the host computer 101 as separate files.

The print data generation software 202 and the extension application 210 may be updated and upgraded, and update processing is performed at different timings. More specifically, a timing at which the print data generation software 202 is acquired by the host computer 101 is different from a timing at which the extension application 210 is acquired. In addition, a trigger by which the print data generation software 202 is acquired by the host computer 101 is different from a trigger by which the extension application 210 is acquired. When the extension application 210 is installed, the OS associates the extension application 210 with the print data generation software 202 and the printing apparatus 102.

The extension application 210 described in the present exemplary embodiment includes a print setting screen extension unit 211, a skip control unit 212, a print function extension unit 213, a print data editing unit 214, and a notification unit 215. The extension application 210 includes shared information 216 which can be commonly accessed from each unit. The shared information 216 is actually a file stored in the external storage device 114 or information stored in the RAM 113. The extension application 210 writes and reads information to and from the shared information 216 by using an application program interface (API) provided by the OS.

The extension application 210 may end the operation every time the processing in each unit ends. In this case, the OS activates the extension application 210 every time a request to use each unit is received. Other configurations are also conceivable. For example, while the OS terminates the operation of the extension application 210 when the processing in the print setting screen extension unit 211 is terminated, the OS may keep the extension application 210 activated even when the processing in the skip control unit 212 is terminated.

Further, the extension application 210 may cancel the processing in the course of processing in each unit. When the job is canceled, the job being processed on a print queue is deleted by the OS.

Upon receiving a print request from the user, the drawing application 201 issues a print instruction to the OS. Also in this configuration, the drawing application 201 can display the print setting screen as in the configuration of FIG. 2A. In this configuration, a print setting screen provided by the extension application 210 is displayed. More specifically, a print setting screen provided by the print setting screen extension unit 211 included in the extension application 210 is displayed. Whether or not the print setting screen provided by the print setting screen extension unit 211 is displayed depends on the user's operation.

When the drawing application 201 receives the print request from the user and the print instruction is issued to the OS, the OS activates the skip control unit 212. The skip control unit 212 controls whether or not to skip the processing in the print data generation software 202. After a skip control process in the skip control unit 212, the OS generates intermediate data based on the print instruction output from the drawing application 201, and the intermediate data is passed to the print data generation software 202. If the skip control unit 212 does not perform the skip control process, the print data generation software 202 processes the intermediate data into print data interpretable by the printing apparatus 102, and transfers the print data to the print data editing unit 214. On the other hand, if the processing in the print data generation software 202 is skipped, the intermediate data is not processed by the print data generation software 202, and is transferred to the print data editing unit 214. Thus, the intermediate data can be processed by the print data editing unit 214.

The print data editing unit 214 edits the intermediate data received from the print data generation software 202 or the print data processed by the print data generation software 202. When layout printing is taken as an example of the editing contents, the print data editing unit 214 changes the layout of the intermediate data or the print data based on print setting information for layout printing received from the OS. The print data editing unit 214 can display a UI screen on the display unit 119, and can display a layout result of the intermediate data or the print data as a preview screen. In the print data editing unit 214, the print data is not transmitted to the printing apparatus 102 in a state in which the screen is opened, and transmission processing of the print data is operated when the screen is closed.

After the print data editing unit 214 edits the print data, the print data is transferred to the printing apparatus 102. The printing apparatus 102 performs printing on a sheet based on the received print data.

When the processing in the print data generation software 202 is skipped by the skip control unit 212, the print data editing unit 214 may convert the received intermediate data into the print data interpretable by the printing apparatus 102. Alternatively, to convert the intermediate data into the print data, a function provided by the OS may be used.

The extension application 210 includes the print function extension unit 213. The print function extension unit 213 can edit the print function information 203 (PDC) generated by the print data generation software 202 or the OS. The print function extension unit 213 can add a function provided by the extension application 210 and a function supported by the printing apparatus 102 but not supported by the print data generation software 202. The print function extension unit 213 can also add an exclusion relation between the setting values of the print functions. The OS activates the print function extension unit 213 when the extension application 210 is associated with the printing apparatus 102 and the print data generation software 202 for the first time.

Further, the OS may activate the print function extension unit 213 at the time of activation of the OS or at another timing. In this way, an optional device (for example, a finisher) can be added to the printing apparatus 102 afterward. In a case where a function related to printing is extended, the print function extension unit 213 can detect an extended function and add the extended function to the print function information 203.

In addition, the extension application 210 includes the notification unit 215. The notification unit 215 can display a notification to the user in response to occurrence of an error in the printing apparatus 102. For example, when an out-of-paper error occurs in the printing apparatus 102, the print data generation software 202 detects the error, and the OS displays a message on the display unit 119 using a notification function called a toast notification, which is a function of the OS. When the user presses the toast notification, the notification unit 215 of the extension application 210 is called by the OS, and a UI screen of the notification unit 215 is displayed. On the UI screen of the notification unit 215, for example, a detailed message of the out-of-paper error and a paper filling method can be displayed.

Note that once the extension application 210 transmits print data to the printing apparatus 102, the extension application 210 cannot display a screen, such as a guide associated with the print data in the middle of processing in each unit.

The configuration of the extension application 210 for realizing the present embodiment is not limited to a configuration including all of the above-described functions (units), and may be a configuration including only some of the functions or a configuration including other functions. The extension application 210 may be simply referred to as print software. As described above, the extension application 210 has at least one of the following functions.

A function of displaying a setting screen (print setting screen extension unit 211)

A function of controlling whether or not to skip the processing in the print data generation software 202 (skip control unit 212)

A function of editing print data input to the printing apparatus (print data editing unit 214)

A function of extending functions which can be designated by the print data generation software (print function extension unit 213)

A function of displaying a screen in response to occurrence of an error in the printing apparatus 102 (notification unit 215)

<Editing Processing of Print Function Information by Print Function Extension Unit>

FIG. 3 illustrates an example of PDC generated by the print data generation software 202 having acquired information about supported print functions from the printing apparatus 102. PDC 301 includes information about functions (Features) supported by the printing apparatus 102 and information about setting values (Options) of certain functions. For example, information 302 indicates that Auto Select (automatic selection) or Plain (plain paper) can be designated as PageMediaType (media). In addition, a default value of a setting value to which an initial value is to be set among the setting values can be indicated as true.

Figure 4A:
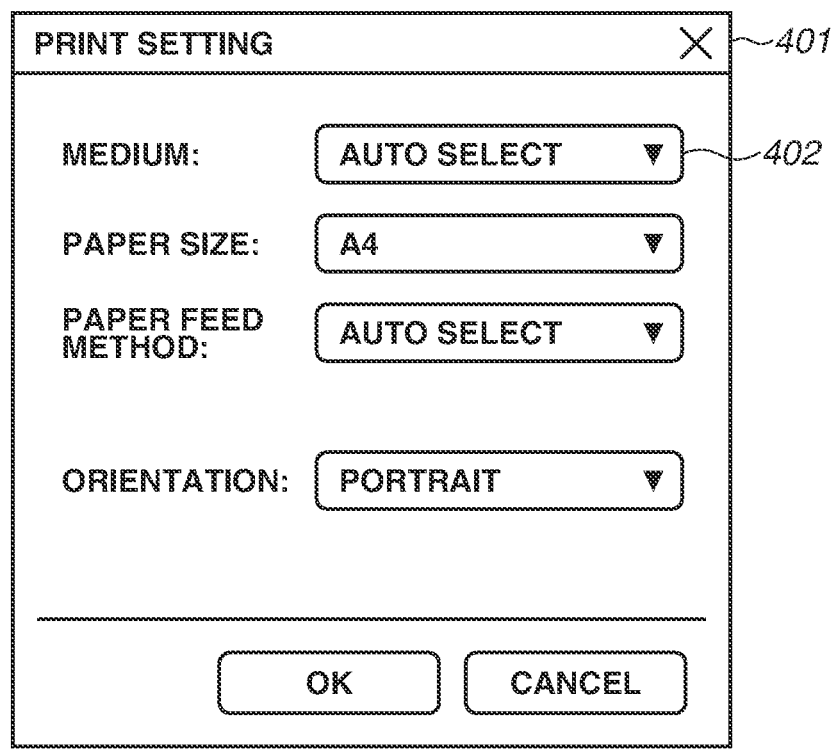
FIGS. 4A and 4B illustrate an example of a print setting screen of a print data generation software.
Figure 4B:
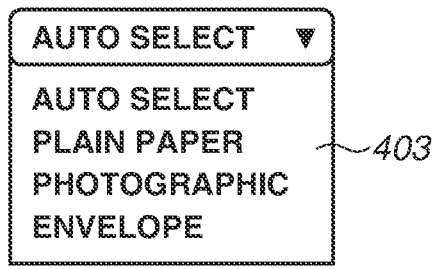

FIG. 4A illustrates an example of a print setting screen provided by the print data generation software 202 when the drawing application 201 displays the print setting screen provided by the print data generation software 202. Each setting value when a print setting screen 401 is activated is determined by the print setting initial value information 204 about the print data generation software 202. FIG. 4A illustrates an example when the medium is in a state of "Auto Select" as the value of the print setting initial value information 204, and illustrates a state where the "Auto Select" is set as a medium 402. FIG. 4B illustrates a state where a combo box of the medium 402 is selected, and each setting value 403 of the medium 402 can be selected.

An initial setting value when the print setting screen is opened is determined by the print setting initial value information 204. The print setting initial value information 204 is stored in a data structure called DEVMODE defined by the OS. FIG. 5A illustrates an example of the DEVMODE of the print setting initial value information 204, and various kinds of print setting information, such as a paper size and a medium, are stored in the DEVMODE. In FIG. 5A, as the print setting initial value information 204 according to the present exemplary embodiment, the initial value of the medium is a value "259", and the medium corresponding to the value is "Auto Select" based on information illustrated in FIG. 5B described below. FIG. 5B is a list of media corresponding to various values of dmMediaType (media) in FIG. 5A, and is information called DeviceCapabilities that can be acquired by an interface of the OS. Each setting value in FIG. 5B is defined by the print data generation software 202 based on the information 302 about the supported media described in the PDC 301. Except for a value predefined by the OS (1: Plain Paper), the print data generation software 202 uniquely defines a value (for example, 259: Auto Select).

FIG. 6 is an example of a processing procedure when the print function extension unit 213 edits the print function information 203 (PDC 301) when the extension application 210 is associated with the printing apparatus 102 and the print data generation software 202 for the first time. In step S601, the print function extension unit 213 acquires information about a medium (vendor-specific medium) from the printing apparatus 102. Next, in step S602, the print function extension unit 213 checks whether each parameter of the information 302 about the media in the PDC 301 is the standard medium (a medium in which the attribute of an option called namespace is defined as psk). In a case where the standard medium is present (YES in step S602), the processing proceeds to step S603. In step S603, the medium is deleted from the PDC 301. In the present embodiment, all pieces of information 302 about the media described in the PDC 301 indicate standard media. When the print function extension unit 213 determines a standard medium in step S602, a medium whose namespace is not a vendor-specific namespace (ns0002) may be determined as the standard medium. In step S603, since the information about the standard medium to be deleted from the PDC 301 is used in an additional process (step S606), which is a process to be described below, the information about the standard medium is stored in the RAM 113 in advance. Thereafter, in step S604, the print function extension unit 213 determines whether checking of all the media has been completed, and if the checking has not been completed (NO in step S604), the above-described processing is repeated. If all the media have been checked (YES in step S604), the processing proceeds to step S605. In step S605, the print function extension unit 213 adds the vendor-specific medium acquired in step S601 to the information 302 about the media in the PDC 301. In step S606, the information about the standard medium stored (held) in the RAM 113 in step S603 is added. At this time, the information about the medium is added in an arrangement order of the media described in the PDC 301, and the medium is added so as not to be different from the arrangement order of the media described in the PDC 301.

If the print function extension unit 213 cannot acquire information from the printing apparatus 102 in step S601, it is determined that the vendor-specific medium in step S605 does not exist, and the processing from steps S602 to S606 is not performed.

FIG. 7 illustrates the print function information 203 (PDC 701) regenerated by the print function extension unit 213. Information about the vendor-specific medium added in step S605 is described as vendor-specific medium information 702, and information about the standard medium added in step S606 is described as standard medium information 703. In the standard media, the attribute of the option called namespace is defined as psk. In the example of FIG. 7, Auto Select, Plain Paper, Photographic, and Envelope are described as the standard media.

The OS regenerates the parameter of the DEVMODE corresponding to each medium based on the information about the medium in the regenerated PDC 701. FIG. 8 illustrates a list of parameters for the media of the regenerated DEVMODE. Since the OS sets a value from the last medium in the PDC 701, the standard media have the same values (the same values as those in FIG. 5B) even after the association of the extension application 210.

As the print setting initial value information 204 about the print data generation software 202, a value "259" is set for the medium as illustrated in FIG. 5. Even after the association of the extension application 210, the media displayed on the print setting screen extension unit 211 of the extension application 210 is activated in a state in which "Auto Select" corresponding to the same value "259" is set. In the present exemplary embodiment, an example in which "Auto Select" (the value "259") is set as the initial value of the medium is described. However, even when "Photographic" (a value "258"), which is another standard medium, is set as the initial value of the medium, performing the processing enables the same medium to be set even after the association of the extension application 210, as illustrated in FIG. 8.

<Print Setting Screen Display Processing by Print Function Extension Unit>

Figure 9A:
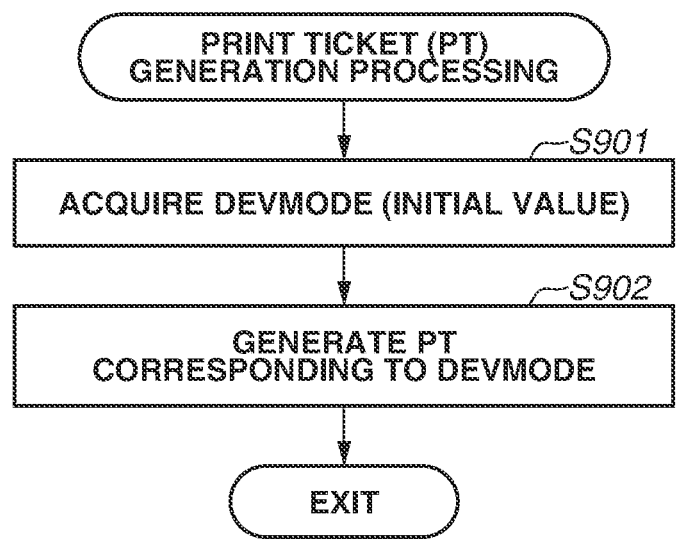
FIGS. 9A and 9B are flowcharts of print setting screen display processing of an extension application.
Figure 9B:
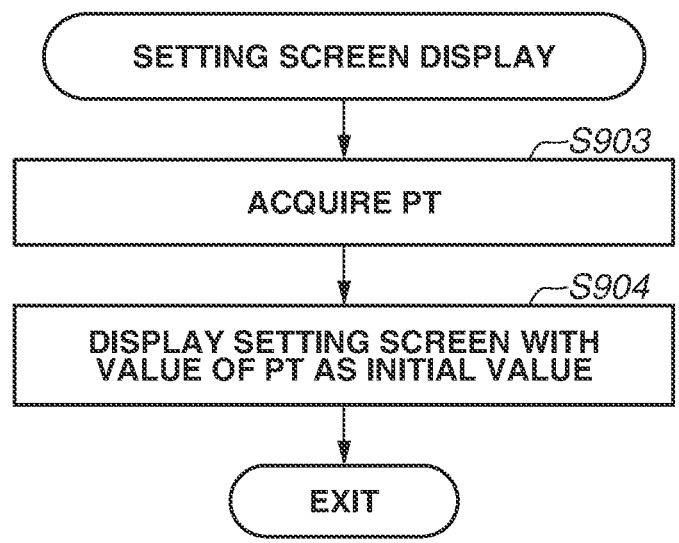

When the user causes the drawing application 201 to display the print setting screen, the print setting screen provided by the print setting screen extension unit 211 included in the extension application 210 is displayed. FIGS. 9A and 9B illustrate processing performed when the print setting screen provided by the print setting screen extension unit 211 is displayed. First, the processing in FIG. 9A is performed by the OS. In step S901, the OS acquires the value of the print setting initial value information 204, and in step S902, the OS converts the value into a PrintTicket. In the case of the present embodiment, the initial value "259" of the medium illustrated in FIG. 5A is specifically determined to be which medium from the list of setting values (FIG. 8) after the association of the extension application 210. A PT is then generated with the media assigned the value of "259" ("Auto Select"). After that, the print setting screen extension unit 211 performs the processing illustrated in FIG. 9B. In step S903, the print setting screen extension unit 211 acquires the PT generated in step S902, and in step S904, the print setting screen extension unit 211 displays the setting screen with the value of the PT (medium "Auto Select") as the initial value in step S904.

Figure 10A:
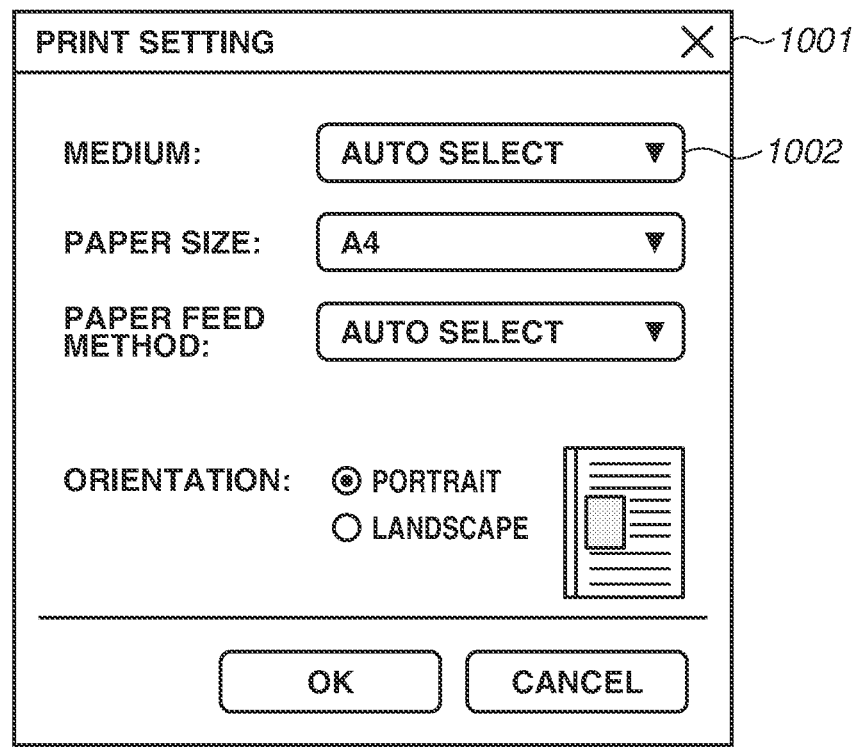
FIGS. 10A and 10B illustrate an example of a print setting screen of the extension application.
Figure 10B:
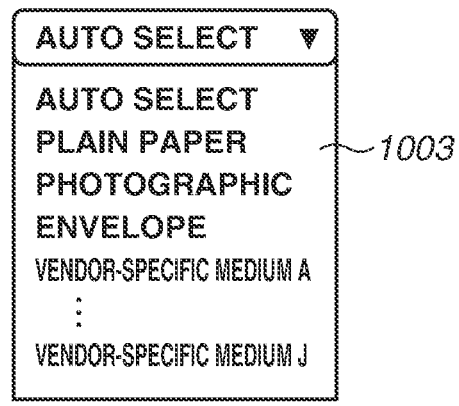

FIGS. 10A and 10B illustrate the displayed print setting screen provided by the print setting screen extension unit 211. A print setting screen 1001 is in a state of being displayed with the setting value in the print setting initial value information 204 by the processing of FIGS. 9A and 9B, and the setting value of a medium 1002 is the same "Auto Select" as the value before the association of the extension application 210. When a combo box of the medium 1002 is selected, as illustrated in FIG. 10B, a list 1003 of setting values of the medium is displayed, and a setting value can be selected.

Figure 11:
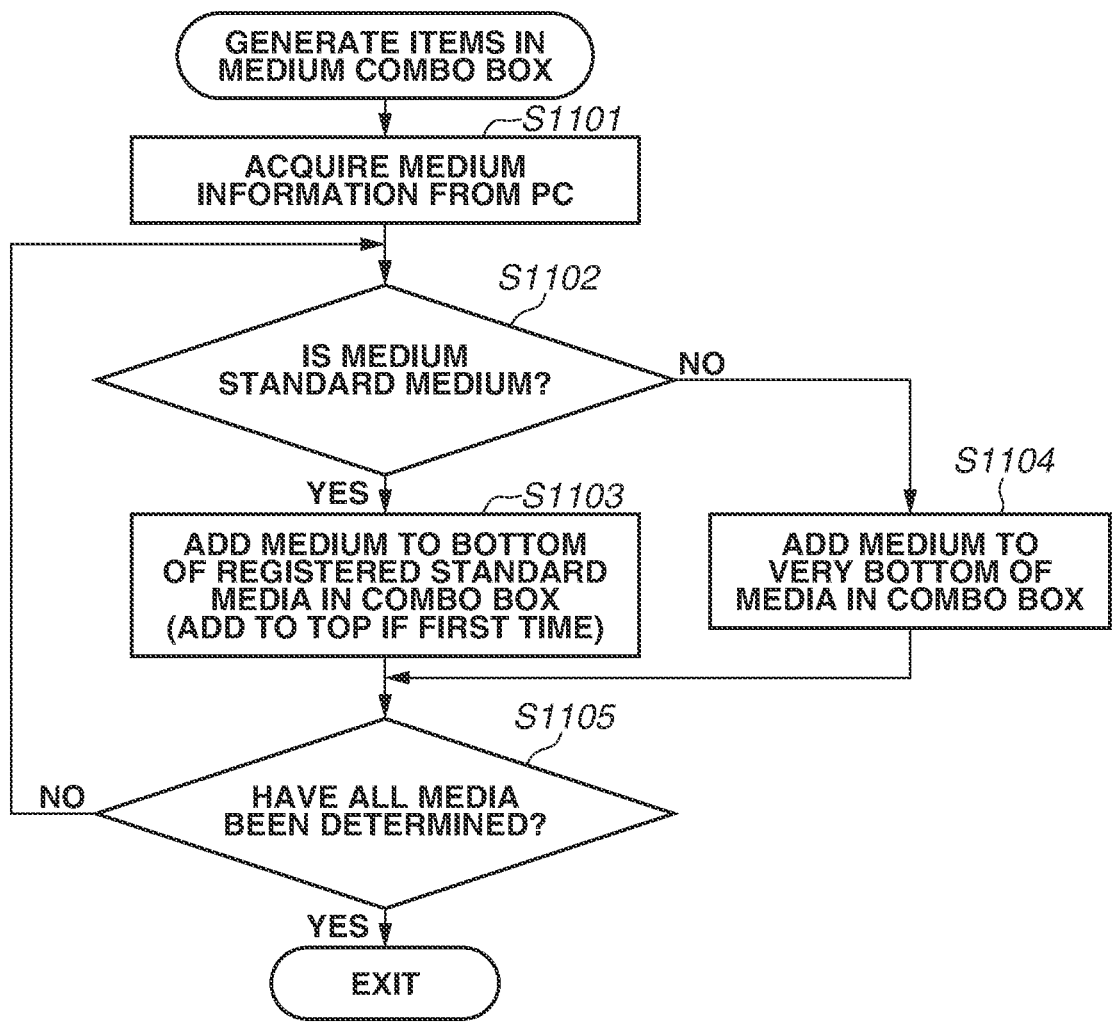
FIG. 11 is a flowchart of a media setting item generation processing of the extension application.

Here, if the list 1003 of the setting values of the medium is displayed in the arrangement order of the media described in the PDC 701, the standard medium information 703 is displayed at the bottom of the list 1003 of the setting values of the medium, and the operability deteriorates. Thus, as illustrated in FIG. 11, a display order of items in the combo box of the medium 1002 is determined. More specifically, first, in step S1101, the print setting screen extension unit 211 acquires information about the PDC 701 as the PC. After that, in step S1102, the print function extension unit 213 determines the type of each medium described in the PC. If the medium is a standard medium (YES in step S1102), the processing proceeds to step S1103. In step S1103, if the standard medium is a first standard medium to be added, the standard medium is arranged on top of the combo box, and if the standard medium is a second or subsequent standard medium to be added, the standard medium is arranged at the bottom of the combo box, below standard media already registered therein. If the medium is not a standard medium (NO in step S1102), the processing proceeds to step S1104. In step S1104, the medium is arranged at the very bottom of the combo box. Whether or not the medium is a standard medium is determined based on whether the attribute of the option called namespace is defined as psk. Thereafter, in step S1105, the print function extension unit 213 determines whether the determination has been completed for all the described media, and if the determination has not been completed (NO in step S1105), the above-described processing is repeated. When the determination has been completed for all the media, the processing is terminated. By rearranging the display order of the media in the combo box in this way, as illustrated in FIG. 10B, the standard media is displayed on top and can be selected.

As described above, in the printing system according to the present exemplary embodiment, the initial value of the medium can be maintained even after the extension application is associated. In the printing system according to the present exemplary embodiment, even after the extension application is associated, printing can be performed with the same setting as that of the standard driver without a user's special operation.

Hereinafter, a second exemplary embodiment will be described. In the present exemplary embodiment, an initial setting medium is changed depending on the capability of the printing apparatus. More specifically, if the type of printer is a 12-color machine, control is performed so that a recommended medium "glossy pro platinum" is set as a default value. Note that configurations and processes not mentioned in the following description are the same as those in the first exemplary embodiment, and a description thereof will be omitted.

<Editing Processing on Print Function Information by Print Function Extension Unit in Second Exemplary Embodiment>

Figure 12:
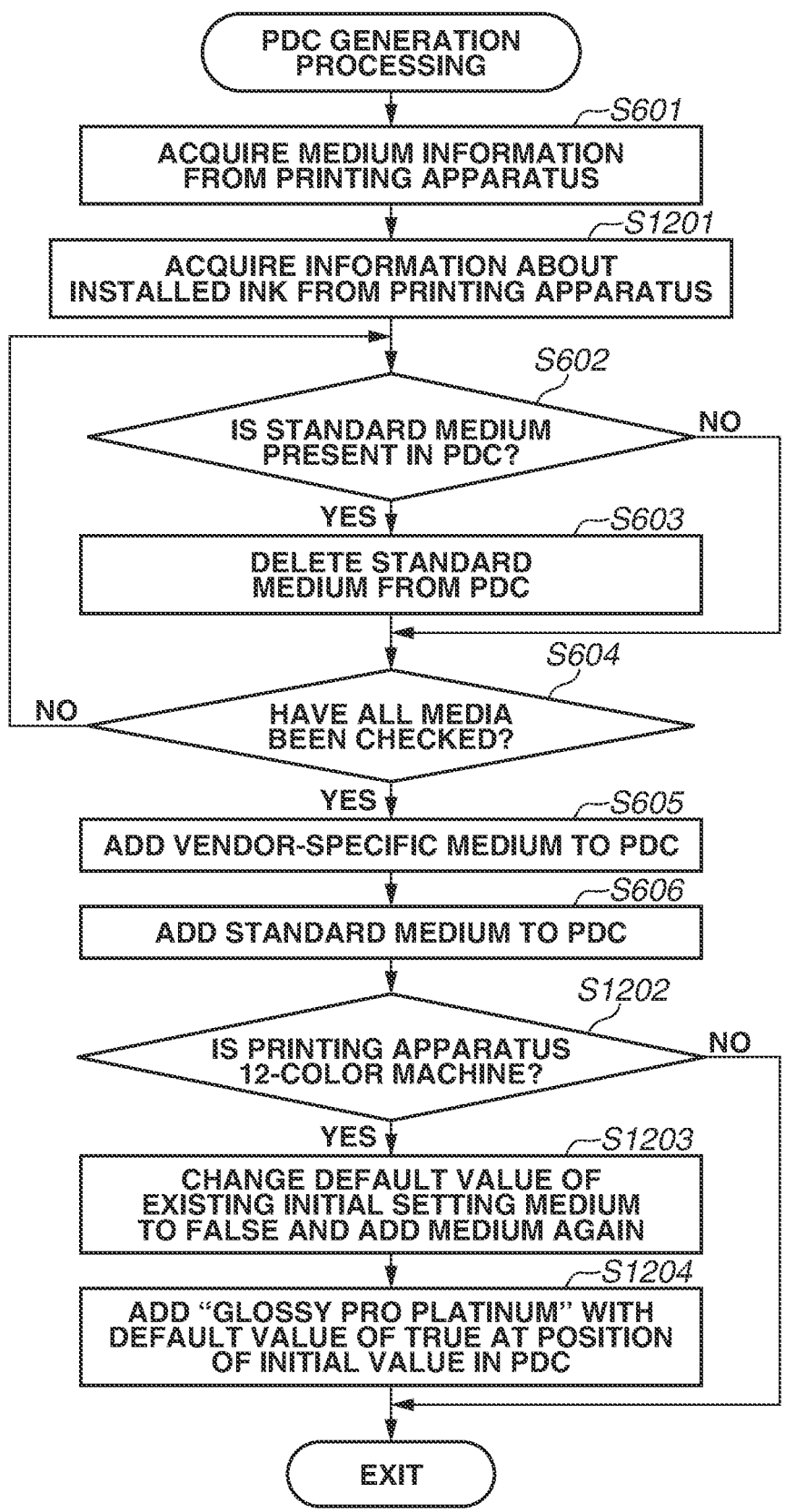
FIG. 12 is a flowchart of an editing process of print function information according to a second exemplary embodiment.

FIG. 12 is an example of a processing procedure when the print function extension unit 213 edits the print function information 203 (PDC 301) when the extension application 210 is associated with the printing apparatus 102 and the print data generation software 202 for the first time in the present exemplary embodiment. The same processes as those in FIG. 6 are denoted by the same reference numerals, and descriptions thereof will be omitted. In step S1201, the print function extension unit 213 acquires, from the printing apparatus 102, information about inks installed in the printing apparatus 102. Thereafter, after the vendor-specific medium and the standard medium are added to the PDC, in step S1202, it is determined whether the inks supported by the printing apparatus 102 are 12 colors from the ink information acquired in step S1201. In the case of a 12-color machine (YES in step S1202), in step S1203, the initial value for an existing medium (a medium whose default value in the PDC is "true") is temporarily deleted from the PDC, and the medium is added again as a parameter whose default value is changed to "false". After that, in step S1204, "glossy pro platinum", which is a medium to be set as the initial value, is deleted from the PDC. Information about the deleted "glossy pro platinum" is added with the default value of "true" at the fourth position (the ordinal number corresponding to the number of standard media) from the end, which is the position of the initial value for the media of the PDC. On the other hand, in step S1201, if the print function extension unit 213 cannot acquire the information from the printing apparatus 102, in step S1202, it is determined that the printing apparatus 102 is not a 12-color machine.

Figure 13:
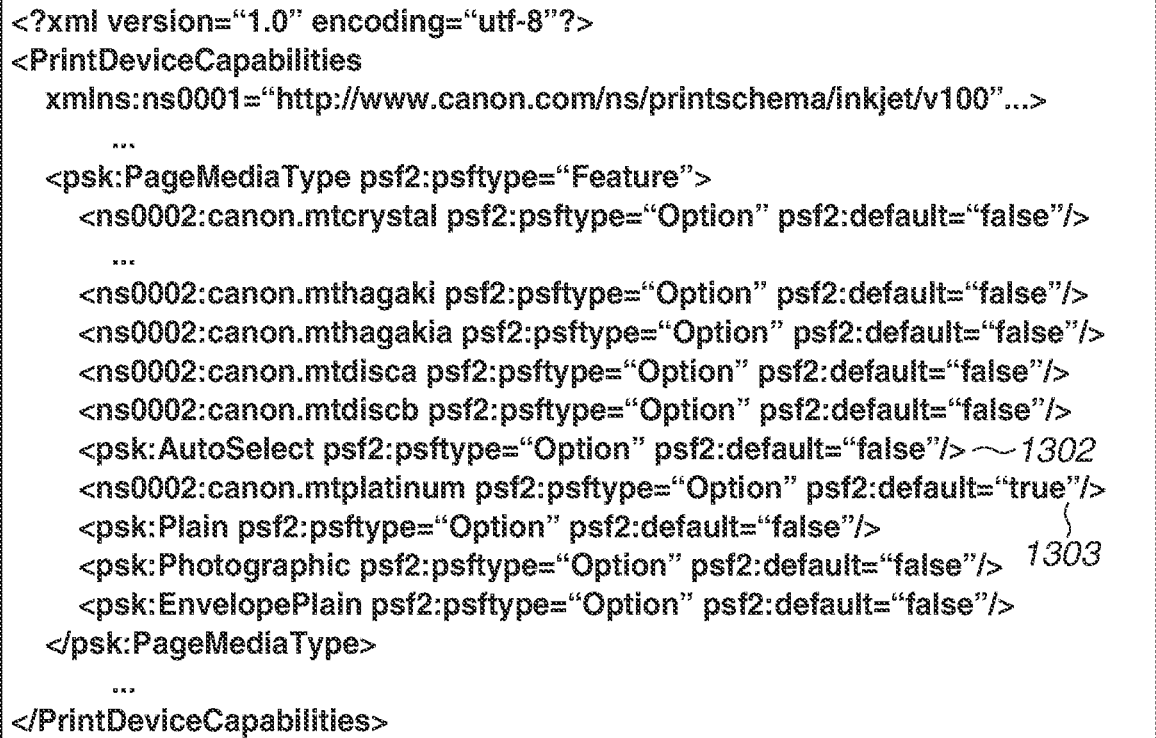
FIG. 13 is an example of PDC after editing according to the second exemplary embodiment.

FIG. 13 is an example of the PDC created by the processing of FIG. 12. In PDC 1301, a setting list of PageMediaType (media) is described. A parameter 1302 is a parameter set as a previous initial value, and a default value, which is an attribute of the initial value, is changed to "false" and added again. In addition, "glossy pro platinum" (canon.mtplatinum) newly designated as an initial value is added with the default value of "true" at a position 1303 of the initial value.

FIG. 14 illustrates a list of parameters of DEVMODE of setting values for the media in the PDC 1301, and "glossy pro platinum" (vendor-specific medium A) is assigned the initial value of "259".

<Print Setting Screen Display Processing by Print Function Extension Unit in Second Exemplary Embodiment>

Figure 15:
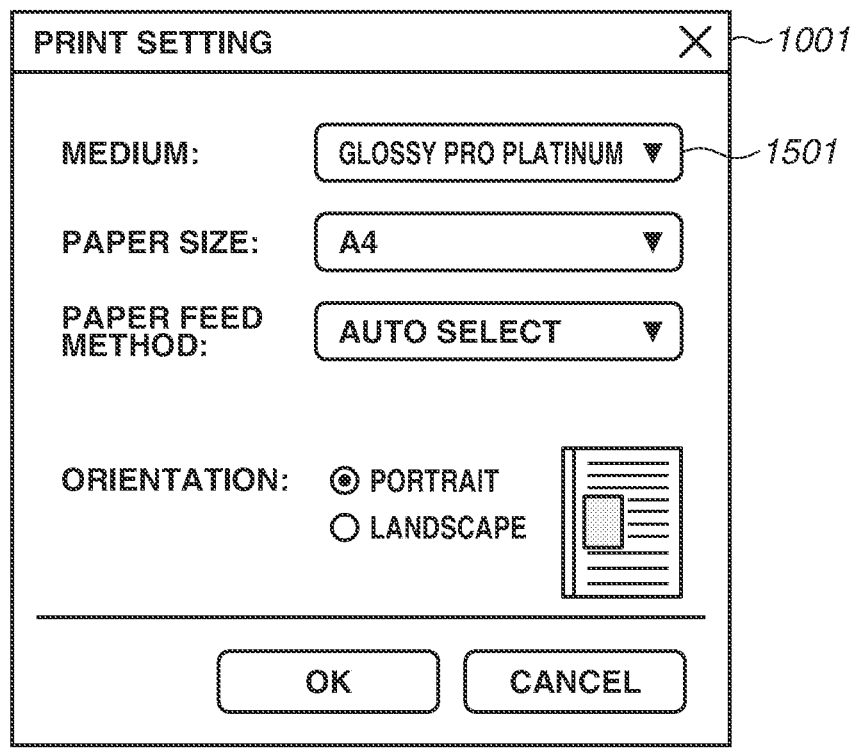
FIG. 15 is an example of a print setting screen of an extension application according to the second exemplary embodiment.

FIG. 15 is a print setting screen provided by the print setting screen extension unit 211 included in the extension application 210, and is displayed when the user causes the drawing application 201 to display the print setting screen. This is the print setting screen displayed when the print setting screen extension unit 211 of the extension application 210 is activated. As processing at the time of activation of the print setting screen extension unit 211, the processing illustrated in FIGS. 9A and 9B is performed as in the first exemplary embodiment. The print setting screen 1001 is activated in a state in which "glossy pro platinum" set as the initial value in the PDC 1301 is set as a setting value of a medium 1501.

In the present exemplary embodiment, an example has been described in which "glossy pro platinum" is set as the initial value in the case of the 12-color machine. However, the present disclosure is not limited to the example, and the initial setting of the medium may be changed depending on capabilities of the printing apparatus. For example, a table in which a medium to be an initial value is associated with each printing apparatus is held, and the initial setting of the medium is changed depending on the printing apparatus using the table.

As described above, the extension application 210 changes the initial setting of the medium depending on the capabilities of the printing apparatus, so that an optimal medium can be provided to the user, and higher-quality printing can be provided.

The present disclosure can also be realized by processing in which a program for implementing one or more functions of the above-described exemplary embodiments is supplied to a system or an apparatus via a network or a storage medium, and one or more processors in a computer of the system or the apparatus read and execute the program. Further, the present disclosure can also be realized by a circuit (for example, an application specific integrated circuit (ASIC)) that implements one or more functions. The program can be executed by a computer of the information processing apparatus.

According to the present disclosure, it is possible to improve usability after an extension application is associated without preparing a setting file in advance.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-118395, filed Jul. 26, 2022, which is hereby incorporated by reference herein in its entirety.

What is claimed is:

1. An information processing apparatus comprising:
one or more memories that store print data generation software, an extension application program for supporting the print data generation software usable for a plurality of printing apparatuses of vendors, print function information, and an operating system performing control so that medium information newly added to the print function information is displayed preferentially; and
a processor that causes, by executing the extension application program, the information processing apparatus to
acquire medium information from a printing apparatus;

add the acquired medium information to the print function information so that the medium information existing in the print function information is displayed prior to the acquired medium information; and cause the information processing apparatus to display, based on the print function information, a medium selecting screen so that the medium information existing in the print function information is displayed prior to the added medium information.

2. The information processing apparatus according to claim 1, wherein the processor causes the information processing apparatus to delete the existing medium information in the print function information, add the acquired medium information to the print function information, and add the deleted medium information to the print function information.

3. The information processing apparatus according to claim 2, wherein the processor further causes the information processing apparatus to hold the existing medium information in a holding memory when the existing medium information is deleted.

4. The information processing apparatus according to claim 3, wherein the processor causes the information processing apparatus to delete the existing medium information in the print function information, add the acquired medium information to the print function information, and add the medium information held in the holding memory to the print function information.

5. The information processing apparatus according to claim 1, wherein the medium information existing in the print function information is standard medium information, and wherein the acquired medium information is vendor specific medium information.

6. The information processing apparatus according to claim 1, wherein the acquired medium information is added to the print function information so that default medium information in displaying the medium selecting screen is not changed.

7. A non-transitory computer-readable storage medium storing an application program executable by a computer of an information processing apparatus and supporting print data generation software usable for a plurality of printing apparatuses of vendors, an operating system of the information processing apparatus performing control so that medium information newly added to the print function information is displayed preferentially, the application program causing the computer to:

acquire medium information from a printing apparatus; and add the acquired medium information to print function information so that medium information existing in the print function information is displayed prior to the acquired medium information; and cause the information processing apparatus to display, based on the print function information, a medium selecting screen so that the medium information existing in the print function information is displayed prior to the added medium information.

8. The non-transitory computer-readable storage medium according to claim 7, wherein the program causes the computer to delete the existing medium information in the print function information, add the acquired medium information to the print function information, and add the deleted medium information to the print function information.

9. The non-transitory computer-readable storage medium according to claim 8, wherein the application program further causes the computer to hold the existing medium information in a holding memory when the existing medium information is being deleted.

10. The non-transitory computer-readable storage medium according to claim 9, wherein the application program causes the computer to delete the existing medium information in the print function information, add the acquired medium information to the print function information, and add the medium information held in the holding portion to the print function information.

11. The non-transitory computer-readable storage medium according to claim 7, wherein the medium information existing in the print function information is standard medium information, and wherein the acquired medium information is vendor specific medium information.

12. The non-transitory computer-readable storage medium according to claim 7, wherein the acquired medium information is added to the print function information so that default medium information in displaying the medium selecting screen is not changed.

\* \* \* \* \*